Figure 1:
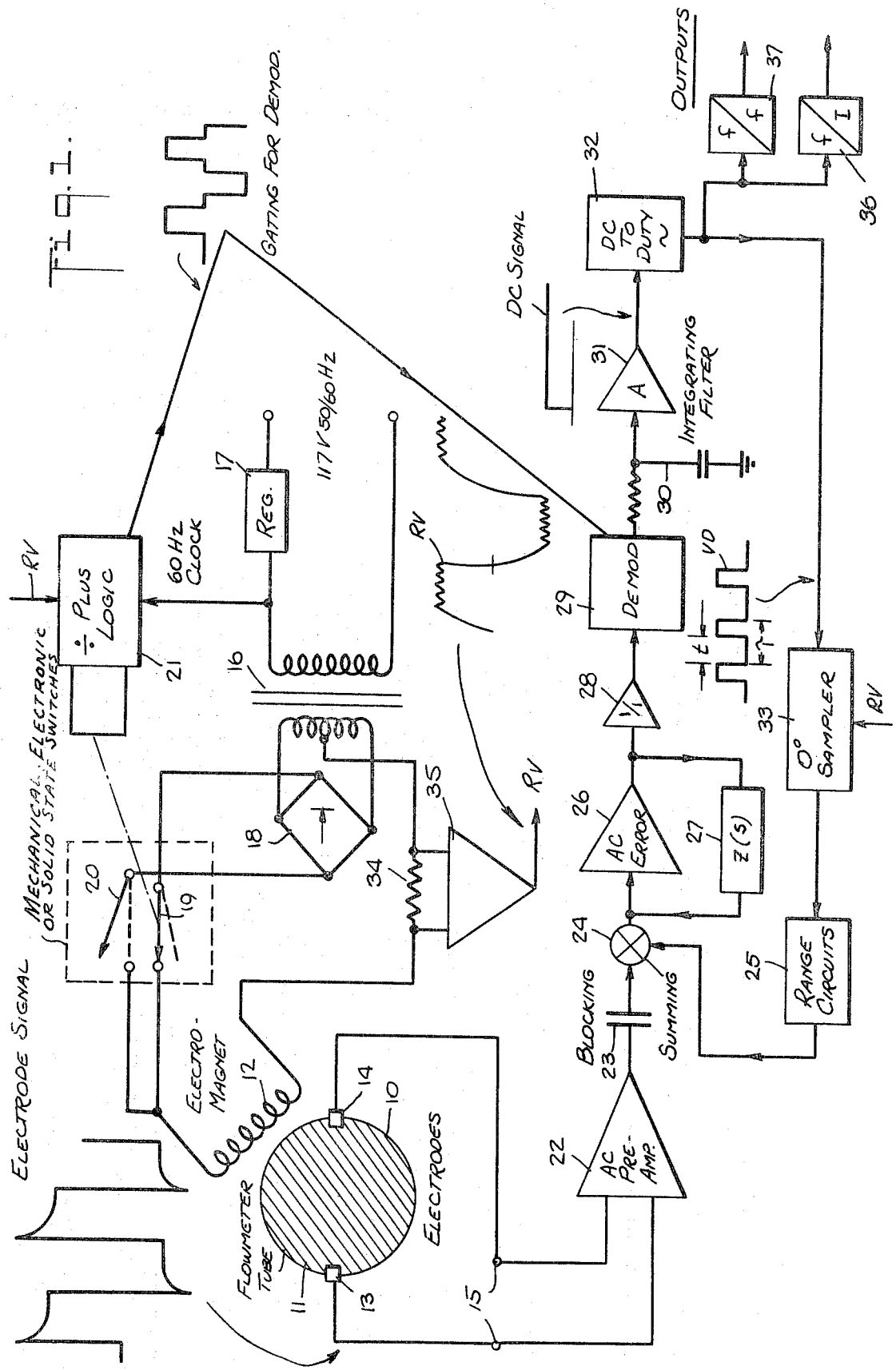

United States Patent [19]
Mannherz et al.

[11] 3,783,687
[45] Jan. 8, 1974

[54] ELECTROMAGNETIC FLOWMETER WITH SQUARE-WAVE EXCITATION

[75] Inventors: Elmer D. Mannherz, Southampton; Hubert A. Riester, Huntington Valley; Roy F. Schmoock, Ivyland; John S. Yard, Warminster, all of Pa.

[73] Assignee: Fischer & Porter Company, Warminster, Pa.

[22] Filed: May 26, 1972

[21] Appl. No.: 257,378

[52] U.S. Cl. ............................................ 73/194 EM
[51] Int. Cl. ............................. G01f 1/00, G01p 5/08
[58] Field of Search ................................. 73/194 EM

[56] References Cited
UNITED STATES PATENTS

| | | | |
|---|---|---|---|
| 2,808,723 | 10/1957 | Buntenbach .................... | 73/194 EM |
| 3,184,966 | 5/1965 | Thornton et al. ............... | 73/194 EM |
| 3,329,018 | 7/1967 | Hognestad ..................... | 73/194 EM |
| 3,550,446 | 12/1970 | Tucker et al. .................. | 73/194 EM |

*Primary Examiner*—Charles A. Ruehl
*Attorney*—Michael Ebert

[57] ABSTRACT

An electromagnetic flowmeter system wherein liquid to be measured is conducted through a flow tube to intersect a transverse magnetic field produced by an electromagnet, the voltage induced in the fluid being transferred to a pair of electrodes mounted at diametrically opposed points on the tube. To avoid spurious voltages arising from stray couplings between the electromagnetic and the loop constituted by the electrodes and the liquid extending therebetween, without, however, causing polarization of the electrodes, the electromagnet is energized by a low-frequency square wave. This wave is produced by applying the output voltage of an unfiltered full-wave rectifier to the electromagnet and periodically reversing the voltage polarity at a low-frequency rate by means of an electronic switch, filtration of the applied voltage being effected largely by the electromagnet induction. Since the steady state field produced by the square wave is disrupted by switching transients occurring at the points of reversal, the converter to which the signal from the electrodes is applied includes a demodulator which is gated synchronously with an electronic switch to yield an output only when the magnet flux achieves a steady state condition.

7 Claims, 9 Drawing Figures

ELECTROMAGNETIC FLOWMETER WITH SQUARE-WAVE EXCITATION

BACKGROUND OF THE INVENTION

This invention relates generally to electromagnetic flowmeter systems, and in particular to a system in which the electromagnet is energized by low-frequency square wave power derived from an unfiltered full-wave rectified A-C source.

In an electromagnetic flowmeter, the liquid whose flow rate is to be measured is conducted through a flow tube provided with a pair of diametrically-opposed electrodes, a magnetic field perpendicular to the longitudinal axis of the tube being established by an electromagnet. When the flowing liquid intersects this field, a voltage is induced therein which is transferred to the electrodes. This voltage, which is proportional to the average velocity of the liquid and hence to its average volumetric rate, is then amplified and processed to actuate a recorder or indicator.

The magnetic field may be either direct or alternating in nature, for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation is clearly advantageous in that polarization is obviated and the A-C flow-induced signal may be more easily amplified, it has distinct drawbacks. The use of an alternating flux introduces spurious voltages that are unrelated to flow rate and, if untreated, give rise to inaccurate indications. The two spurious voltages that are most troublesome are:

1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

Pure "quadrature" voltage has heretofore been minimized by an electronic arrangement adapted to buck out this component, but elimination of its in-phase component has not been successful. Existing A-C operated electromagnet flowmeters are also known to vary their calibration as a function of temperature, fluid conductivity, pressure and other effects which can alter the spurious voltages both with respect to phase and magnitude.

Hence, it becomes necessary periodically to manually re-zero the meter to correct for the effects on zero by the above-described phenomena.

All of the adverse effects encountered in A-C operation of electromagnetic flowmeters can be attributed to the rate of change of the flux field ($d\emptyset/dt$, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous d-c operation, the ideal condition $d\emptyset/dt = 0$ is satisfied. But d-c operation to create a steady state field is not acceptable, for galvanic potentials are produced and polarization is encountered, as previously explained. Hence in the present invention, in order to obtain the positive benefits of a steady state field without the drawbacks which accompany continuous d-c operation, the steady state flux field is periodically reversed or interrupted.

SUMMARY OF THE INVENTION

In view of the foregoing, the main object of this invention is to provide an electromagnetic flowmeter system in which the need to re-zero the meter at frequent intervals is eliminated, meter accuracy being maintained without recalibration.

More specifically, an object of this invention is to provide an electromagnet flowmeter system in which the excitation current for the electromagnet in the flowmeter primary is a low-frequency "square wave equivalent" serving to produce a periodically-reversed steady state flux field whereby unwanted in-phase and quadrature components are minimized without giving rise to polarization and galvanic effects.

Because switching transients are developed at the points of polarity reversal, the steady state condition of the flux field is disturbed at these points. A significant feature of the invention is that flow-measurement is taken in the secondary or read-out assembly associated with the flowmeter primary only in the intervals when the flux achieves a steady state condition, the unsteady state transients being effectively blocked-out.

Yet another object of this invention is to provide low-frequency, square-wave power for exciting the magnet coil of a flowmeter, the square wave being produced by periodically reversing the output of an unfiltered full-wave a-c rectifier.

Although in an arrangement in accordance with the invention, the raw full-wave rectified voltage used to produce the square wave has a pronounced ripple component, this component is largely removed by the filtering action of the electromagnetic circuit, thereby dispensing with the need for separate filtering elements.

Also an object of this invention is to provide a low-cost electromagnetic flowmeter system which is of simpler construction than existing a-c operated systems and yet functions reliably and efficiently, with a high order of measurement accuracy.

Briefly stated, in an electromagnetic flowmeter system in accordance with the invention, the liquid to be measured is conducted through a flow tube in which it intersects a transverse magnetic field produced by an electromagnet, the voltage induced in the field as a function of liquid velocity being transferred to a pair of diametrically-opposed electrodes mounted on the tube along an axis perpendicular both to longitudinal flow axis and the transverse magnetic field.

The electromagnetic coil is driven by square-wave power derived from an unfiltered, full-wave a-c rectifier whose output polarity relative to the coil is periodically reversed by an electronic switch at a rate which is low with reference to the frequency of the a-c source, the electromagnet circuit acting to filter the unfiltered rectified voltage. The flow-induced signal from the electrodes is applied to a secondary including a demodulator whose operation is synchronized with the polarity-reversing switching action and is gated to produce a d-c output only when the magnetic flux established by the electromagnet is in a steady state condition whereby transients arising at the points of reversal are eliminated.

OUTLINE OF THE DRAWING

Figure 3:
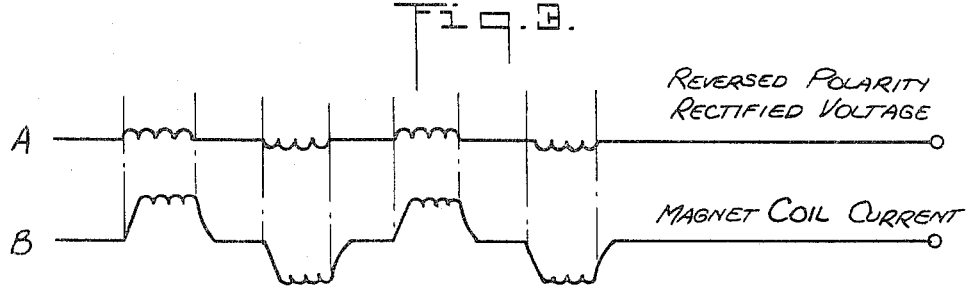

For a better understanding of the invention, as well as other objects and further features thereof, reference is made to the following detailed description to be read in conjunction with the accompanying drawing, wherein:

FIG. 1 is a block diagram of an electromagnetic flowmeter system in accordance with the invention;

FIG. 2A to E are wave forms representing voltages or currents generated at various points in the system;

FIG. 3A and B are wave forms produced in another embodiment of the system, and

Figure 4:

FIG. 4 is the wave form produced in still another embodiment of the system.

DESCRIPTION OF THE INVENTION

Referring now to FIG. 1, there is shown a flowmeter system in accordance with the invention, constituted by a primary in the form of an electromagnetic flowmeter adapted to produce a low-level a-c signal output whose amplitude is proportional to the flow rate of the liquid being measured, and a secondary which converts this low level a-c signal to a proportional d-c current output signal.

In addition to the analog d-c current output, the secondary also yields a pulse output whose frequency is proportional to flow rate, the pulse output being useful in operating digital registers, counters or batch control systems. By means of proper scale factoring, registry of total accumulated flow may be integrated from this rate signal.

The flowmeter primary includes a flow tube 10 through which the liquid 11 to be measured is conducted. An electromagnetic having a coil 12 is provided to establish a magnetic field transverse to the direction of flow, which is parallel to the longitudinal axis of the tube. Electrodes 13 and 14 in contact with the flowing fluid are disposed at diametrically-opposed points on the flow tube on an axis which is perpendicular both to the longitudinal direction of flow and the transverse magnetic field.

As is well known, a voltage is induced in the liquid whose flow intersects the magnetic field, this voltage being transferred to the electrodes to produce a signal at flowmeter output terminals that reflects the flow rate. This signal is referred to as the flow-induced signal to distinguish it from spurious signal components that are independent of flow rate.

Magnet coil 12 is energized by a relatively low-frequency square wave derived from a full-wave rectifier power supply constituted by a transformer 16 whose primary is connected to an a-c power line through a regulator 17, the line supplying the usual 50 or 60 Hz current. The secondary of transformer 16 is connected to the input junctions of a full-wave rectifier bridge 18, whose output junctions are connected to the respective movable contacts of two single-pole single-throw switches 19 and 20 whose fixed contacts are both connected to one end of magnet coil 12. The other end of the coil is connected to the center tap of the secondary of transformer 16.

When switch 19 is closed and switch 20 is simultaneously open, the recified output is applied to the magnet coil in one polarity, and when switch 19 is open and switch 20 is simultaneously closed, the polarity is reversed. While for purpose of explanation, switches 19 and 20 are shown as mechanical devices, in practice these switches are in electronic form and may be constituted by thyratrons, triacs or any other type of electronic switching device in vacuum tube or solid state form.

Switches 19 and 20 are activated at a rate which is low relative to the frequency of the a-c line. This is accomplished by means of a presettable scaler or frequency divider 21 to which the 60 Hz line voltage is applied as a clock signal, the scaler yielding low frequency pulses in the order of 1⅞, 3¾ or 7½ Hz.

The low frequency pulses from the scaler are applied to the firing electrodes of the two triac switches (or whatever other electronic switching devices are used) to alternately turn on the triacs and thereby connect either the positive or the negative side of the full-wave rectified 60 Hz voltage to the magnet coil. Thus when switch 19 is closed, current flows through the magnet coil in one direction, and when switch 20 is closed, the current flow in the reverse direction.

Figure 2:
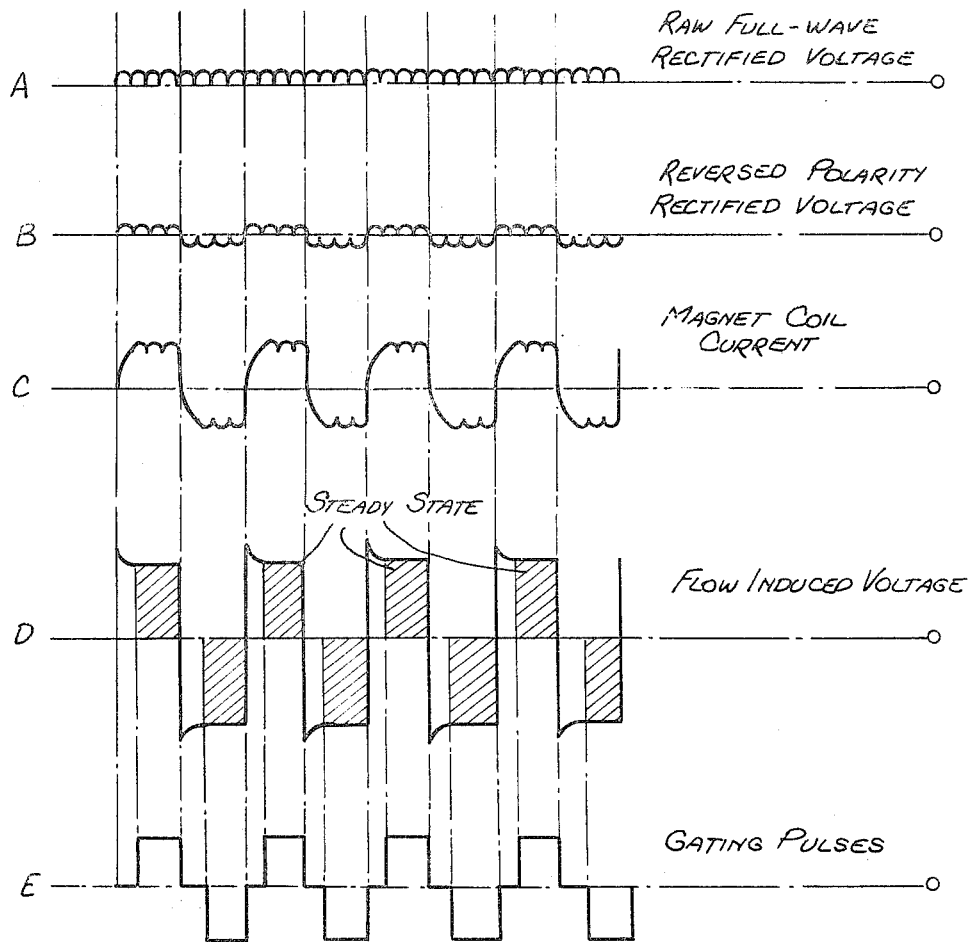

Because the output of the full-wave rectifier is a raw, unfiltered direct voltage, it is composed, as shown in FIG. 2A, by a continuous train of half-cycle pulses, all of the same polarity. But with the low-frequency switching action in accordance with the invention, the voltage applied to magnet coil 12 is periodically reversed in polarity as shown in FIG. 2B, as a result of which the current passing through the coil has the form shown in FIG. 2C, in which the current has a 120 Hz ripple component.

Because the electromagnet has a relatively high inductance, it functions as a filter choke and, in practice, it takes out as much as 75 percent of the ripple component. The remaining portion of the 120 Hz ripple component that appears in the flow-induced signal is smoothed out at the summing junction of the secondary via the filter action of the associated error amplifier, to be later described. This obviates the need for filter capacitors associated with the choke, as in conventional filters. Thus, the system functions as if it were excited by a "square wave equivalent" having a substantially constant amplitude.

The flow induced signal appearing at output terminal 15 of the flowmeter primary is fed to a secondary constituted by a converter. This converter is essentially an all solid state a-c feedback system producing a frequency output (and optimal current) whose rate is proportional to flow.

U.S. Pat Nos. 3,260,109 and 3,254,243, and Instruction Bulletins 50ED 3000 and 50SF 2000, published by the Fischer & Porter Company of Warminster, Pa., disclose similar converters but in these prior arrangements, the converters include relatively elaborate means to suppress spurious in-phase and quadrature components generated as a result of capacitive and inductive couplings between the magnet coil and the electrode loop. In the present invention, the converter is substantially simplified, for with low-frequency square-wave excitation, these spurious components are minimized to a degree where there is no need to null them out.

In the converter shown in FIG. 1, the flow-induced signal appearing at output terminals 15 of the flowmeter is applied to the first stage of the converter which is an a-c pre-amplifier 22. This signal has the shape shown in FIG. 2D, where it will be seen that the signal has a generally square-wave formation but for the spikes appearing at the points of polarity reversal. These spkes are the result of switching transients or surges, and have a duration depending on the inductance-resistance time constant of the electromagnetic circuit.

The constant level portion of the square wave, as indicated by cross-hatching, reflects the steady state condition of the magnetic field, and has an amplitude that is directly proportional to the velocity of liquid passing through the flow-tube. Hence it is only this portion of the signal which is of interest for accurate measurement purposes.

The output of pre-amplifier 22 is applied through a blocking capacitor 23 (or alternately to a blocking transformer) to one input of a summing junction 24 to whose other input is fed the output of a range attenuation circuit 25 from an error signal type of feedback loop. The error signal produced by a comparison of the flow signal and the feedback signal in the summing junction is amplified in a-c error amplifier 26, which is provided with a sub-negative feedback circuit 27 adapted to attenuate all frequencies lower and higher than that of the error signal.

The a-c output of the error amplifier is applied to an inverting 1:1 amplifier 28, whose output is applied to a full-wave demodulator 29. The operation of the demodulator is synchronized with the low-frequency switching rate of the magnet coil and is so gated as to block the applied error signal at those points corresponding to the point of polarity reversal, the blockage being maintained for the duration of the inductance-resistance time constant of the electromagnetic circuit. In this way, the d-c output of the demodulator reflects only the steady state magnetic flux condition, the spiked portions of the flow-induced signal being suppressed.

In order to so synchronize the demodulator, the frequency divider 21 which responds to the 50 or 60 cycle signal to produce low-frequency control pulses for governing the electromagnet switching action is provided with suitable logic to produce gating pulses at the same low-frequency rate. These gating pulses, as shown in FIG. 2E, are coincident with the hatched portion (steady state) of the flow-induced signal shown in FIG. 2D. Thus, the demodulator is activated only during the steady state intervals and is otherwise blocked. As a consequence, the secondary only looks at the flow-induced signal during the period that $d\Phi/dt$ is equal to zero.

The d-c output pulses produced by demodulator 29 are applied to a resistance-capacitance integrating circuit 30 to produce a direct-voltage error signal whose magnitude is a function of flow rate. This error signal is applied to a direct-current amplifier 31, whose output is used as a controlled bias for a d-c to frequency converter 32 that, in practice, may take the form of a blocking oscillator.

The blocking oscillator translates the d-c error signal level to a variable frequency pulse train which exhibits a duty cycle that is proportional to the error signal. (Duty cycle is defined as the pulse width or on-time interval ($t$) divided by the total period ($\tau$). This variable duty cycle error signal VD is used to drive the output circuits of the system as well as serving as the take-off point for the error signal feedback circuit.

For purposes of feedback, the variable duty cycle error signal must first be restored to a proportional low-frequency signal (i.e., 1⅞ Hz or whatever low frequency is in effect). This is accomplished by means of a sampling circuit 33 coupled to the dc-to-duty cycle converter 32 and acting to sample an in-phase reference voltage RV derived from the electromagnetic circuit. To generate this reference voltage, a fractional-ohm resistor 34 is interposed between magnet coil 12 and the center tap of the secondary of transformer 16, the voltage drop thereacross depending on current flow through the magnet coil. This voltage is applied to an operational amplifier 35 to produce reference voltage RV at its proper level.

The output of sampler 33 is constituted by the duty-cycle pulses derived from the d-c to frequency converter, enveloped by the low frequency square wave reference voltage RV. This output is fed to summing junction 24 through the range attenuator 25. Inasmuch as this feedback signal depends on the amplitude of reference voltage RV, any variation in the voltage as a result of line fluctuations will proportionately change the feedback signal. Since it is the ratio of the flow-induced signal to the feedback signal that constitutes the measurement criterion, no loss of accuracy will be experienced with variations in line voltage (within reasonable limits).

The signal from the dc-to-duty cycle converter is applied to a duty-cycle-to-dc converter 16, which converts the pulses of the former into an analog d-c output that is proportional to fluid flow rate. The signal from the dc-to-duty cycle converter is also applied to a pulse scaler 37 which converts the applied pulses into engineering units which are available to drive an external counter.

In the arrangement shown in FIG. 1, the raw full-wave rectified voltage is in the form of a continuous train of uni-directional half-cycle pulses, the voltage being periodically reversed in polarity at a relatively low rate. Because low-cost triacs cannot be switched rapidly, the arrangement shown in FIG. 1 works best with high powered transistors which are arranged to function as switches.

But such transistors are relatively expansive. In order, therefore, to make the use of triacs feasible, the rectifier circuit is arranged to provide discontinuous trains of half-wave pulses, as shown in FIG. 3A in which each train of pulses is separated by a zero voltage interval of some duration. The electronic switches in this instance function to reverse the polarity of successive trains, as shown in FIG. 3B, the blank intervals serving to allow sufficient preparatory time for the switching actions carried out by the triacs.

Instead of reversing polarity, the electronic switches may be arranged to merely interrupt the flow of unidirectional half-wave pulses to the magnet coil so that instead of a square-wave current in the coil in which successive square wave pulses alternate in polarity, all of the square-wave pulses are of the same polarity, as shown in FIG. 4. This last arrangement has the advantages of simplicity.

While there have been shown preferred embodiments of electronic flowmeters in accordance with the invention, it will be appreciated that many changes and modifications may be made therein without, however, departing from the essential spirit of the invention.

We claim:

1. An electromagnetic flowmeter system comprising:
   A. an electromagnetic flowmeter primary including a flow tube having a pair of electrodes mounted at diametrically-opposed positions, and an electromagnet provided with a coil to produce a transverse magnetic field within said tube, the voltage induced in the liquid passing through said tube and intersecting said field being transferred to said electrodes to provide a flow-induced signal,
   B. means to excite said electromagnet, including a full-wave rectifier connectable to an a-c power line having a predetermined frequency and producing an unfiltered d-c voltage, and switching means to periodically apply said unfiltered d-c voltage to said coil at a rate which is low relative to said predetermined frequency whereby a steady state field is periodically established in said flow tube except at the points of switching when transients are created whose duration is a function of the inductance of said coil, said electromagnet having sufficient inductance to effectively filter said rectified d-c voltage, and
   C. a secondary coupled to said electrodes and responsive to said flow-induced signal to provide an output signal indicative of liquid flow rate, said secondary including a demodulator to convert said flow-induced signal into a d-c voltage, and pulsatory means to synchronize the operation of said demodulator with said switching means so as to activate said demodulator only during the periods in which the magnetic field is in a steady state condition, said demodulator being blocked during said transient intervals.

2. A system as set forth in claim 1, wherein said predetermined frequency is at least 50 Hz and said switching rate is less than 10 Hz.

3. A system as set forth in claim 1, wherein said switching means is constituted by electronic solid state switching devices.

4. A system as set forth in claim 3, wherein said solid state switching devices are activated by low-frequency pulses produced by a divider circuit coupled to said a-c power line, said line frequency serving as a clock.

5. A system as set forth in claim 4, wherein said pulsatory means to synchronize the operation of said demodulator is coupled to said divider circuit.

6. A system as set forth in claim 1, wherein said switching means is arranged to periodically reverse the polarity of the rectified voltage applied to said magnet coil.

7. A system as set forth in claim 1, wherein said secondary includes a summing junction to which is applied said flow-induced signal and a feedback signal to produce an error signal.

* * * * *

UNITED STATES PATENT OFFICE
CERTIFICATE OF CORRECTION

Patent No. 3,783,687    Dated January 8, 1974

Inventor(s) Elmer D. Mannherz, Hubert A. Riester, Roy F. Schmoock and John S. Yard.

It is certified that error appears in the above-identified patent and that said Letters Patent are hereby corrected as shown below:

In the Abstract, line 8 "tromagnetic" should have read -- tromagnet --
Column 2, line 1 "electromagnet" should have read -- electromagnetic --
    line 11 "(d0)/dt" should have read -- $\frac{(d\emptyset)}{dt}$ --
    line 19 "(d0)/dt" should have read -- $\frac{(d\emptyset)}{dt}$ --
    line 35 "electromagnet" should have read --electromagnetic--
Column 3, line 13 "electromagnet" should have read -- electromagnetic --
    line 56 "electromagnetic" should have read -- electromagnet --
Column 4, line 21 "purpose" should have read -- purposes --
    line 41 "flow" should have read -- flows --
Column 5, line 61 "electromagnet" should have read -- electromagnetic --
Column 6, line 2, "d0/dt" should have read -- $\frac{d\emptyset}{dt}$ --
    line 63 "expansive" should have read -- expensive --

Signed and sealed this 30th day of April 1974.

(SEAL)
Attest:

EDWARD M. FLETCHER, JR.
Attesting Officer

C. MARSHALL DANN
Commissioner of Patents